US007740355B2

(12) United States Patent
Sessner et al.

(10) Patent No.: US 7,740,355 B2
(45) Date of Patent: Jun. 22, 2010

(54) DEVICE AND METHOD FOR DETERMINING OPTICAL PARAMETERS

(75) Inventors: Rainer Sessner, Munich (DE);
Leonhard Schmid, Raisting (DE);
Dietmar Uttenweiler, Munich (DE);
Jochen Brosig, Gruenwald (DE);
Werner Mueller, Oetisheim (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 11/883,046

(22) PCT Filed: Jan. 26, 2006

(86) PCT No.: PCT/EP2006/000695

§ 371 (c)(1),
(2), (4) Date: Sep. 9, 2008

(87) PCT Pub. No.: WO2006/079540

PCT Pub. Date: Aug. 3, 2006

(65) Prior Publication Data

US 2009/0021693 A1    Jan. 22, 2009

(30) Foreign Application Priority Data

Jan. 26, 2005    (DE)  ................. 10 2005 003 699

(51) Int. Cl.
*A61B 3/10* (2006.01)
*A61B 3/14* (2006.01)
*A61B 3/00* (2006.01)

(52) U.S. Cl. .................. 351/204; 351/208; 351/246; 351/206

(58) Field of Classification Search .................. 351/206, 351/204, 205, 208, 231, 246
See application file for complete search history.

(56) References Cited

U.S. PATENT DOCUMENTS 5,592,248 A    1/1997    Norton et al.

(Continued)

FOREIGN PATENT DOCUMENTS

DE    100 33 983 A1    10/2001
WO    WO 01/88654 A2    11/2001

OTHER PUBLICATIONS

International Search Report dated May 29, 2006 including English translation of pertinent portion (Twelve (12) pages).

(Continued)

*Primary Examiner*—Jack Dinh
(74) *Attorney, Agent, or Firm*—Crowell & Moring LLP

(57) ABSTRACT

The invention relates to a device (10) for determining the optical parameters of a user comprising: at least two image recording devices (14, 16), which are configured and arranged to respectively generate image data of at least subsections of the head of the user (30); a data processing unit comprising a user data determination device, which is configured to use the generated image data to determine user data relating to at least one sub-section of the head, or at least one sub-section of a system placed on the head that supports a pair of glasses (38) of the user (30) in a normal position of wear, the user data containing the three-dimensional location information of predetermined points in the head sub-section or the system sub-section and comprising a parameter determination unit, which is configured to determine at least some of the optical parameters of the user (30); a data output device, which outputs at least some of the determined optical parameters of the user (30). The invention also relates to an additional device, a corresponding method and a computer program.

28 Claims, 8 Drawing Sheets

U.S. PATENT DOCUMENTS

| | | |
|---|---|---|
| 5,617,155 A | 4/1997 | Ducarouge et al. |
| 6,659,609 B2 | 12/2003 | Mothes |
| 2003/0123026 A1 | 7/2003 | Abitbol et al. |
| 2004/0189935 A1 | 9/2004 | Warden et al. |

OTHER PUBLICATIONS

German Office Action dated Jan. 13, 2006 (Five (5) pages).
Form PCT/IB/373 and Form PCT/ISA/237 (Seven (7) Pages).

DEVICE AND METHOD FOR DETERMINING OPTICAL PARAMETERS

RELATED APPLICATIONS

This application is a U.S. National Stage Entry under 35 U.S.C. §371 of PCT/EP2006/000695, filed on Jan. 1, 2006, and claims the benefit of priority to German Patent Applicant No. 10 2005 003 699.6, filed Jan. 26, 2005. The disclosure of each of which are incorporated by reference herein in their entirety.

FIELD OF THE INVENTION

The present invention relates to a device for determining optical parameters of a user, a method for determining optical parameters of a user, and a computer program product for performing the method.

BACKGROUND OF THE INVENTION

Due to the introduction of individually optimized spectacle lenses, it is possible to deal with the requirements of people having vision errors and, for example, provide spectacle lenses having individually optimized visual ranges. Custom-fitted spectacle lenses make it possible to make an optimal correction of the optical defects of the vision of a wearer of spectacle lenses. Individual calculation and adaptation of spectacle lenses is also possible for sports spectacles, which are distinguished by large deflections, bow angles, and pantoscopic angles.

To completely exhaust the optical advantages of individual spectacle lenses, in particular of individually adapted progressive power lenses, it is necessary to calculate and produce these spectacle lenses knowing the wearing position of the user and to wear them in accordance with the wearing position used for calculation and production. The wearing position is a function of multiple parameters, for example, the interpupillary distance, the bow angle, the spectacle lens pantoscopic angle, the spectacle frame, the corneal vertex distance of the system of spectacles and eye, and the grinding height of the spectacle lenses. These and further parameters, which may be used and/or are necessary for describing the wearing position, are contained in relevant standards, such as DIN EN ISO 1366, DIN 58 208, DIN EN ISO 8624, and DIN 5340 and may be taken therefrom. Furthermore, it is necessary for the spectacle lenses to be situated and/or centered in a spectacle frame in accordance with the optical parameters which were used for the production, so that the spectacle lenses are actually worn in accordance with the optical parameters in the wearing position.

Multiple measuring devices are available to the optician for determining the individual optical parameters. For example, the optician may analyze pupillary reflexes using a so-called pupillometer and/or determine the distance of the pupil centers to ascertain the interpupillary distance in this way.

Pantoscopic angle and corneal vertex distance may be determined using a measuring device in which, in the habitual head and body posture of the customer, the measuring device is held on a frame plane of a spectacle frame. The pantoscopic angle may be read off laterally via a gravity-driven pointer on the basis of a scale. An engraved ruler is used for determining the corneal vertex distance, using which the distance between the estimated groove base of the spectacle frame and the cornea is also measured from the side.

The bow angle of the spectacle frame may be determined using a measuring device on which the pair of spectacles is laid. The nasal edge of an optic disk has to be situated over a pivot point of a movable measuring arm, the other optic disk running parallel to an engraved line. The measuring arm is set in such a way that a marked axis of the measuring arm runs parallel to the frame plane of the optic disk lying above it. The bow angle may subsequently be read off a scale.

It is an object of the present invention to provide a possibility for precisely determining optical parameters of a user in a simple way.

This object is achieved by the device according to Claim 1, the device according to Claim 27, the method according to Claim 28, and the computer program according to Claim 31. Preferred embodiments and/or variations are the subject matter of the dependent claims.

According to one aspect of the present invention, a device according to the present invention for determining optical parameters of a user comprises at least two image recording units, which are designed and situated to generate image data of at least sub-sections of the head of the user;

a data processing unit having a user data determination unit, which is designed to determine user data of at least one sub-section of the head or at least one sub-section of a system of the head and a pair of spectacles of the user situated thereon in the wearing position on the basis of the generated image data, the user data comprising location information in the three-dimensional space of predetermined points of the sub-section of the head or of the sub-section of the system and a parameter determination unit, which is designed to determine at least one part of the optical parameters of the user on the basis of the user data;

a data output unit, which is designed to output at least one part of the determined optical parameters of the user.

Preferably, three-dimensional data of the sub-section of the head or the system of the head and the pair of spectacles is advantageously generated on the basis of the present device. The three-dimensional data are determined using the image data. The image data which are generated using a first image recording unit differ from the image data which are generated using a second image recording unit. The differences in the image data arise in particular because the two image recording units are preferably situated at different positions. Because of the preferably different positions of the at least two image recording units, the particular image data are generated from different perspective views of the head and/or the sub-section of the head. Coordinates in the three-dimensional space, for predetermined or predeterminable points on the head of the user or on the system of the head and the pair of spectacles, may be determined on the basis of the different perspective views and/or the different image data of the sub-section of the head thus generated, while knowing the position of the cameras in relation to one another.

Two recording units in the meaning of the present invention are two digital cameras, for example, which are positioned separately from one another. It is possible that an image recording unit preferably comprises a digital camera and at least one optical deflection element and/or mirror, the image data of the sub-section of the head being recorded and/or generated by the camera using the deflection mirror. Two image recording units therefore comprise two digital cameras in particular and at least two deflection elements or mirrors in the same way, for example, one digital camera and at least one deflection mirror representing one image recording unit in each case. Furthermore, two image recording units may preferably also comprise precisely one digital camera and two deflection elements or mirrors, image data being recorded and/or generated with a time delay using the digital camera. For example, image data are generated at a first instant, the sub-section of the head being imaged using one deflection mirror, and image data are generated at a second instant, said data imaging the sub-section of the head using the other deflection mirror. Furthermore, the camera may also be situated in such a way that image data are generated by the camera at the first or second instant, no deflection mirror being necessary and/or situated between the camera and the head.

Advantageously, a representation of at least the sub-section of the head or at least one sub-section of the system of the head and the pair of spectacles of the user situated thereon in the wearing position is determined using the device according to the present invention on the basis of two-dimensional image data. Location relations to one another in the three-dimensional space of the user data may be determined easily on the basis of this three-dimensional representation and the optical parameters of the user may be determined therefrom.

In particular, multiple optical parameters of the user necessary for describing the wearing position of a pair of spectacles and/or the spectacle lenses may advantageously be determined precisely and easily.

Furthermore, image data of sub-sections which overlap as much as possible, in particular the same sub-section of the head of the user, is generated by the two image recording units, the image recording units being designed and situated in such a way that at least one pupil of the user is completely imaged in the first image data. Furthermore, only the generated image data in which a pupil of the user is completely imaged is used for determining the user data. In particular, the same pupil of the user is completely imaged in image data which are generated by the two or more image recording units.

Furthermore, both pupils of the user may be imaged in each case in the image data of the two image recording units.

The data processing unit is preferably a computer or microprocessor. Furthermore, the user data determination unit and the parameter determination unit may operate independently of one another. Preferably, the data processing unit is designed in such a way that the user data determination unit and the parameter determination unit are operated using a microprocessor. In other words, the data processing unit is designed in such a way that a microprocessor executes both the task(s) of the user data determination unit and also those of the parameter determination unit.

Furthermore, the image recording units are preferably designed and situated in such a way that at least one pupil of the user and a pupil frame edge and/or a spectacle lens edge is imaged in the generated image data, the at least one pupil of the user being enclosed by the spectacle frame edge and/or spectacle lens edge in the generated image data.

In other words, a two-dimensional image of at least one sub-section of the head of the user is generated by each image recording unit. Each of the images contains one pupil of the user or both pupils of the user. For example, image data which have been generated by an image recording unit may only contain one pupil of the user. Image data which are generated by a further image recording unit, in contrast, contain both pupils of the user. In each case, at least one pupil is imaged and at least one spectacle frame edge and/or one spectacle lens edge is imaged in all image data used for further analysis, it being the same pupil in all of this image data. Furthermore, the spectacle frame edge or spectacle lens edge assigned to the imaged pupil is imaged. The image recording units are additionally designed and situated in such a way that the image of the pupil lies inside the image of the spectacle frame or spectacle lens edge in the two-dimensional image data. Especially preferably, the image of the pupil lies completely inside the image of the spectacle frame or spectacle lens edge.

In a further preferred embodiment of the present invention, the user data comprise location information for at least one of the following points:

intersection points of a horizontal plane in the reference system of the user with the spectacle lens edges and/or the spectacle frame edges of the spectacles, the horizontal plane of the user intersecting both pupils of the user and running parallel to a predetermined zero line of sight of the user;

intersection points of a vertical plane in the reference system of the user with the spectacle lens edges and/or the spectacle frame edges of the spectacles, the vertical plane of the user running perpendicularly to the horizontal plane of the user and parallel to the predetermined zero line of sight of the user and intersecting a pupil of the user;

at least one pupil center point;

delimitations of at least one spectacle lens of the user according to dimensioning in the boxing system;

bridge center point of the spectacle frame of the pair of spectacles.

Dimensioning in the boxing system is understood in the meaning of the present invention as the measurement system as is described in the relevant standards, for example, in DIN EN ISO 8624 and/or DIN EN ISO 1366 and/or DIN 58 208 and/or DIN 5340. Furthermore, reference is made, in regard to the boxing system and further typical terms and parameters used, to the book "Die Optik des Auges und der Sehhilfen [The Optics of the Eye and Visual Aids]" by Dr. Roland Enders, 1995 Optische Fachveröffentlichung GmbH, Heidelberg, and the book "Optik und Technik der Brille [Optics and Technology of Spectacles]" by Heinz Diepes and Ralf Blendowksi, 2002 Verlag Optische Fachveröffentlichungen GmbH, Heidelberg. The standards and the cited books thus represent an integral part of the disclosure of the present application for the definitions of terms.

The delimitations according to dimensioning in the boxing system comprise, for example, frame points for one eye or both eyes which lie furthest to the outside or inside and/or up or down. These frame points are typically determined on the basis of tangents on the spectacle frame and/or the areas of the spectacle frame assigned to the particular eyes (compare DIN 58 208; FIG. 3).

The zero viewing direction in the meaning of the present invention is a viewing direction straight ahead with parallel visual axes. In other words, this is a viewing direction which is defined by a position of the eye in relation to the head of the user, the eyes looking at an object which is at eye height and is situated at an infinitely distant point. As a result, the zero viewing direction in the meaning of the present invention is solely determined by the position of the eyes in relation to the head of the user. If the head of the user is in a vertical upright position, the zero viewing direction essentially corresponds to the horizontal direction in the reference system of the earth. However, the zero viewing direction may be tilted in relation to the horizontal direction in the reference system of the earth, if, for example, the user inclines his head to the front or to the side without further movement of the eyes. Analogously, a plane is spanned by the zero viewing direction of both eyes which is essentially parallel to the horizontal plane in the reference system of the earth. The plane which is spanned by the two zero viewing directions of the two eyes may also be inclined to the horizontal plane in the reference system of the earth, if the user inclines his head forward or to the side, for example.

Preferably, the horizontal plane of the user corresponds to a first plane and the vertical plane of the user corresponds to a second plane which is perpendicular to the first plane. For example, the horizontal plane in the reference system of the user may be situated parallel to a horizontal plane in the reference system of the earth and only run through the center point of one pupil. This is the case in particular if the two eyes of the user are situated at different heights (in the reference system of the earth), for example.

The optical parameters of the device according to the present invention preferably comprise one of the following values:
 interpupillary distance;
 monocular interpupillary distance;
 corneal vertex distance according to reference point requirement and/or according to eye rotation point requirement;
 monocular centration distance;
 centration point coordinates;
 lens distance or boxed lens distance;
 decentration of the centration point;
 lens height and width or boxed lens height and width;
 lens center distance or boxed lens center distance;
 spectacle lens pantoscopic angle;
 bow angle;
 grinding height.

Furthermore, the optical parameters also preferably comprise an eye rotation point of an eye and/or parameters, on the basis of which dynamic vision behavior of the user may be determined, such as convergence of an eye position and/or gaze deflection.

The interpupillary distance essentially corresponds to the distance of the pupil centers. The optical parameters comprise especially preferred physiological and anatomical parameters of a spectacle wearer, frame-specific properties, and features of a system of spectacles-eye of the user, which is described in DIN 58208, for example. The features of the system spectacles-eye of the user may be used for calculating spectacle lenses and for precise centration of spectacle lenses, for example, centration data being determined according to the cited norms exactly in relation to an optic disk or frame plane. The plane of the optic disk is the plane through a horizontal and vertical center line (in the reference system of the earth) in the right or left boxing system in the spectacle frame. The frame plane is the plane through center lines, which are vertical to one another, of the boxing systems establishing the right and left disk plane of the spectacle frame.

Furthermore, in the operating position, the image recording units are preferably situated within a spatial area which is enclosed by a cone having a predetermined aperture angle, the cone apex of the cone being situated in the surroundings of a predetermined reference point and the cone axis being situated parallel to a predetermined direction, the zero viewing direction of the user corresponding to the predetermined direction in operation.

In other words, the image recording units are preferably situated in a conical volume. The apex of the cone is located at a distance of less than 20 cm, preferably less than 10 cm, more preferably approximately 0 cm from the reference point.

Preferably, in operation, the location of one of the pupils of the user or the location of the root of the nose of the user approximately corresponds to the predetermined reference point. In operation of the device, the user may be positioned in such a way that the location of one of the pupils or the root of the nose of the user is approximately at the predetermined reference point, i.e., essentially the cone apex. The distance between the cone apex of the cone and one of the pupils and/or the root of the nose of the user is preferably less than approximately 20 cm, more preferably less than approximately 10 cm, especially preferably approximately 0 cm.

According to a further preferred embodiment of the present invention, the aperture angle of the cone is less than 90°, more preferably between approximately 60° and approximately 10°, especially preferably between approximately 45° and approximately 20°, particularly approximately 30°. The aperture angle corresponds to the angle between the axis of symmetry of the cone and the lateral surface of the cone, the cone being rotationally symmetric. In other words, the cone volume may be described by rotation of a right triangle, the triangle rotating around a cathetus and the lateral surface of the cone being described on the basis of the rotation of the hypotenuse of the right triangle. The aperture angle of the cone corresponds to the angle between the hypotenuse and the axis of rotation, i.e., the cited cathetus of the right triangle.

User data may advantageously be determined very effectively by the configuration of the image recording units on a cone having an aperture angle preferably of approximately 30°, because image data may be generated without the pupils of the user being concealed by the spectacle frame or a nose of the user, for example.

Furthermore, effective optical axes of the image recording units preferably at least approximately intersect, an intersection angle being between approximately 60° and approximately 10°, preferably between approximately 45° and approximately 20°, especially preferably approximately 30°.

Effective optical axes of the image recording units in the meaning of the present invention are those areas of lines which extend from the center point of the particular apertures of the image recording units perpendicular to these apertures and intersect the imaged sub-section of the head of the user. In other words, the effective optical axes are particularly the optical axes of the image recording units, these optical axes typically being situated perpendicular to a lens system of the image recording units and extending from the center of the lens system. If no further optical elements, such as deflection mirrors or prisms, are situated in the beam path of the image recording units, the effective optical axis essentially corresponds to the optical axis of the image recording unit. However, if further optical elements, such as one or more deflection mirrors, are situated in the beam path of the image recording unit, the effective optical axis no longer corresponds to the optical axis of the image recording unit as it extends from the image recording unit.

In other words, the effective optical axis in the meaning of the present invention is the section of an optical axis of an image recording unit, (said axis possibly optically deflected multiple times), which intersects the direction of the head of the user without change. The optical axis of the image recording unit corresponds to a line which extends from a center point of an aperture of the image recording unit at a right angle to a plane which comprises the aperture of the image recording unit, the direction of the optical axis of the image recording unit being changeable by optical elements, such as mirrors and/or prisms.

Approximately intersect in the meaning of the present invention means that the effective optical axes have a smallest distance of less than approximately 10 cm, preferably less than approximately 5 cm, especially preferably less than approximately 1 cm. At least approximately intersect therefore means that the effective axes intersect or approximately intersect.

In a further preferred embodiment, in operation, the zero viewing direction of the user is situated essentially parallel to the effective optical axis of at least one of the image recording units. In other words, in the operating state, at least one of the image recording units is situated in such a way that the zero viewing direction of the user may be situated essentially parallel to the effective optical axis of this image recording unit, or the user may position himself in such a way that his zero viewing direction is situated essentially parallel to the effective optical axis of this image recording unit.

In a further preferred embodiment of the present invention, the effective optical axis of at least one of the image recording units is situated essentially parallel to a horizontal direction in the reference system of the earth.

Furthermore, in operation, the horizontal plane of the user is preferably situated in such a way that the effective optical axis of at least one of the image recording units lies therein. I.e., in the operating state of the device of the present invention, at least one of the image recording units is preferably situated in such a way that the user may position himself and/or the user may be positioned in such a way that the horizontal plane of the user comprises the effective optical axis. In the operating state, the user may therefore orient his head in such a way that the horizontal plane preferably comprises the effective optical axis of the image recording unit. The horizontal plane may preferably also be the horizontal plane in the reference system of the earth.

In an especially preferred embodiment, in the operating position, one of the image recording units is situated in such a way that its effective optical axis at least approximately intersects the root of the nose of the user. In other words, in the operating state of the device of the present invention, the user may preferably be positioned and/or position himself in such a way that the effective optical axis of at least one of the image recording units approximately intersects the root of the nose of the user. Approximately intersects means in this case that the minimum distance between the effective optical axis and the root of the nose of the user is less than approximately 10 cm, preferably less than approximately 5 cm, especially preferably less than approximately 1 cm.

In a further preferred embodiment, in the operating position, at least one of the image recording units is situated in such a way that its effective optical axis is situated essentially symmetrically in relation to the pupils of the user. Situated symmetrically in relation to the pupils means in the meaning of the present invention that every point on the effective optical axis has the same distance to both pupils of the user. In other words, the effective optical axis lies in a plane which is situated perpendicularly to a connecting line of the center points of the two pupils and halves this connecting line.

The effective optical axes of the at least two image recording units preferably approximately intersect. In particular the effective optical axes of the at least two image recording units are situated in such a way that a location of minimal distance of the two effective optical axes is at the same distance from both pupils of the user. In particular, a location of minimal distance of the effective optical axes corresponds to the location of the root of the nose of the user. In other words, the effective optical axes at least approximately intersect, the intersection of the effective optical axes and/or the point having minimum distance from the effective optical axes being situated symmetrically in relation to the pupils of the user, preferably corresponding to the location of the root of the nose of the user.

Furthermore, projections of the effective optical axes of the at least two image recording units preferably on a horizontal plane in the reference system of the earth intersect at an intersection angle which is between approximately 10° and approximately 60°, preferably between approximately 15° and approximately 40°, especially preferably approximately 23.5°, by which simplified selection of the user data is achieved.

It is advantageously possible on the basis of the preferred device of the present invention to determine user data of the user even for spectacle frames having very wide bows or for sport spectacle frames, which essentially conceal the eye laterally.

In a further preferred embodiment of the present invention, projections of the effective optical axis of the at least two image recording units on a vertical plane in the reference system of the earth intersect at an intersection angle which is between approximately 10° and approximately 60°, preferably between approximately 15° and approximately 40°, especially preferably approximately 23.5°.

In an especially preferred embodiment of the present invention, in the operating position, the zero viewing direction of the user is situated parallel to the horizontal plane in the reference system of the earth.

Furthermore, the user data determination unit preferably comprises a user data positioning unit, which is designed to assign predetermined user data positions in the two-dimensional space of the image data. In other words, user data, i.e., location information in the three-dimensional space, are imaged on location information in the two-dimensional space. For example, the pupil center point is imaged in the generated two-dimensional image data.

In a further preferred embodiment of the present invention, the user data positioning unit is designed in such a way that the positions in the image data which are assigned to at least one part of the predetermined user data are assignable by a person. For example, delimitations of at least one spectacle lens of the user may be assigned according to a dimensioning in the boxing system by a person.

In a further especially preferred embodiment, the user data positioning unit is designed to predetermine positions of the image data which are assigned to the predetermined user data taking location information of at least one of the image recording units in the three-dimensional space into consideration. According to a preferred embodiment, the assignment of the positions in the image data may be performed by a person. The assignment of the positions is preferably not possible for all existing positions, however, but rather solely for a predetermined selection of positions. For example, the intersection point of a horizontal plane in the reference system of the user with the spectacle lens edges may preferably not be assigned completely along the spectacle lens edges, but rather solely along one or more straight lines in the image data.

In a further preferred embodiment, the user data positioning unit is designed to automatically assign at least one part of the user data to positions in the two-dimensional space of the image data. For example, the positions of the pupils center point may be automatically assigned and/or determined in the two-dimensional space of the image data.

Preferably, the at least two image recording units are designed to generate image data synchronously, the image data recording units especially preferably synchronously generating image data of both eyes of the user.

Furthermore, the image recording units are preferably designed to generate image data of the user sequentially for multiple different viewing directions of the user. For this purpose, for example, image data may be generated for different discrete viewing directions, i.e., discrete deflections of the eyes. However, it is also possible that image data are generated for different discrete head orientations.

In particular, vision behavior of the user may be determined using the data processing device on the basis of the multiple image data. Especially preferably, the image data may be generated in a very rapid chronological sequence using the image recording units, so that the data processing device may determine essentially continuous vision behavior of the user.

According to a further aspect of the present invention, a device for determining optical parameters of a user comprises
- at least one image recording unit, which is designed and situated to generate image data of at least sub-sections of the head of the user;
- at least one pattern projection unit, which is designed and situated to project predetermined pattern data on at least sub-sections of the head of the user;
- a data processing unit having
  - a user data determination unit, which is designed to determine user data of at least one sub-section of the head or at least one sub-section of a system of the head and a pair of spectacles of the user situated thereon in the wearing position on the basis of the generated image data, taking the projected pattern data into consideration, the user data comprising location information in the three-dimensional space of predetermined points of the sub-section of the head or the sub-section of the system, and
  - a parameter determination unit, which is designed to determine at least one part of the optical parameters of the user on the basis of the user data;
- a data output unit, which is designed to output at least one part of the determined optical parameters of the user.

The device preferably comprises precisely one image recording unit and precisely one pattern projection unit, three-dimensional user data of the sub-section of the head or the sub-section of the system also advantageously being able to be generated according to this aspect of the present invention, analogously to the preceding aspect of the present invention. The three-dimensional user data may advantageously be generated on the basis of image data of only one image recording unit. Preferably, the three-dimensional data are generated using the principle of phase-measuring triangulation. For this purpose, pattern data are superimposed on the head or the sub-section of the head and/or projected thereon using the pattern projection unit. The image recording unit generates image data of the at least sub-section of the head in the two-dimensional space. A surface structure of the sub-section of the head, i.e., the coordinates in the third dimension, is generated by phase information of the projected pattern data indirectly via intensity patterns.

As a result, according to this aspect of the present invention, three-dimensional user data may be generated. The optical parameters of the user may be determined on the basis of the three-dimensional user data analogously to the preceding aspect of the present invention, only one image recording unit being used.

The pattern projection unit is, for example, a typical projector such as a commercially available video projector. The projected pattern data are, for example, a striped pattern or a binary sinusoidal pattern. The pattern data are projected on at least one sub-section of the head of the user and image data are generated therefrom using the image recording unit. Image data are generated at a triangulation angle by the image recording unit from the sub-section of the head of the user thus illuminated. The triangulation angle corresponds to the angle between an effective optical axis of the image recording unit and a projection angle of the pattern projection unit. Height differences of the sub-section of the head correspond to lateral displacements of the stripes of the striped pattern as the preferred pattern data, for example. Preferably, the so-called phase shift method is used in the phase-measuring triangulation, a periodic wave pattern which is approximately sinusoidal in the intensity distribution being projected on the sub-section of the head and the wave pattern being moved step-by-step in the projector. During the movement of the wave pattern, image data are preferably generated at least three times by the intensity distribution (and the sub-section of the head) during one period. The intensity distribution may be concluded from the generated image data and a phase position of the image points to one another may be determined, points on the surface of the sub-section of the head being assigned to a specific phase position in accordance with their distance from the image recording unit. Furthermore, reference is made to the academic thesis having the title "Phasenmessende Deflektometrie (PDM)—ein hochgenaues Verfahren zur Vermessung von Oberflächen [Phase-Measuring Deflectometry (PDM)—a High Precision Method for Measuring Surfaces]" by Rainer Seßner, March 2000, which represents an integral part of the disclosure of the present application for further definitions of terms.

A further aspect of the present invention is to provide a method for determining optical parameters of the user having the following steps:
- generating image data of at least sub-sections of the head of the user from at least two different recording directions;
- determining user data of at least one sub-section of the head or at least one sub-section of a system of the head and a pair of spectacles of the user situated thereon in the wearing position on the basis of the generated image data, the user data comprising location information in the three-dimensional space of predetermined points of the sub-section of the head or the sub-section of the system;
- determining at least one part of the optical parameters of the user on the basis of the user data, and
- outputting at least one part of the determined optical parameters of the user.

Two different recording directions is understood in the meaning of the present invention to mean that different image data are generated of overlapping sub-sections of the head, preferably of the same sub-section of the head, in particular that image data of identical sub-sections of the head of the user is generated from different perspective views. As a result, the same sub-section of the head is imaged, but the image data differ. Different recording directions may also be achieved, for example, in that the image data are generated by at least two image recording units, effective optical axes of the at least two image recording units not being parallel.

In a preferred embodiment variation of the method of the present invention, at least one pupil is completely imaged in the generated image data.

Furthermore, at least one pupil of the user and a spectacle frame edge and/or a spectacle lens edge is preferably imaged in the generated image data, the at least one pupil of the user being enclosed by the spectacle frame edge and/or the spectacle lens edge in the generated image data.

According to a further aspect of the present invention, a computer program product having program parts is provided which, when loaded in a computer, is designed for executing the method according to the present invention.

The present invention is described for exemplary purposes in the following on the basis of the attached drawings of preferred embodiments.

DETAILED DESCRIPTION OF THE DRAWINGS

Figure 1:
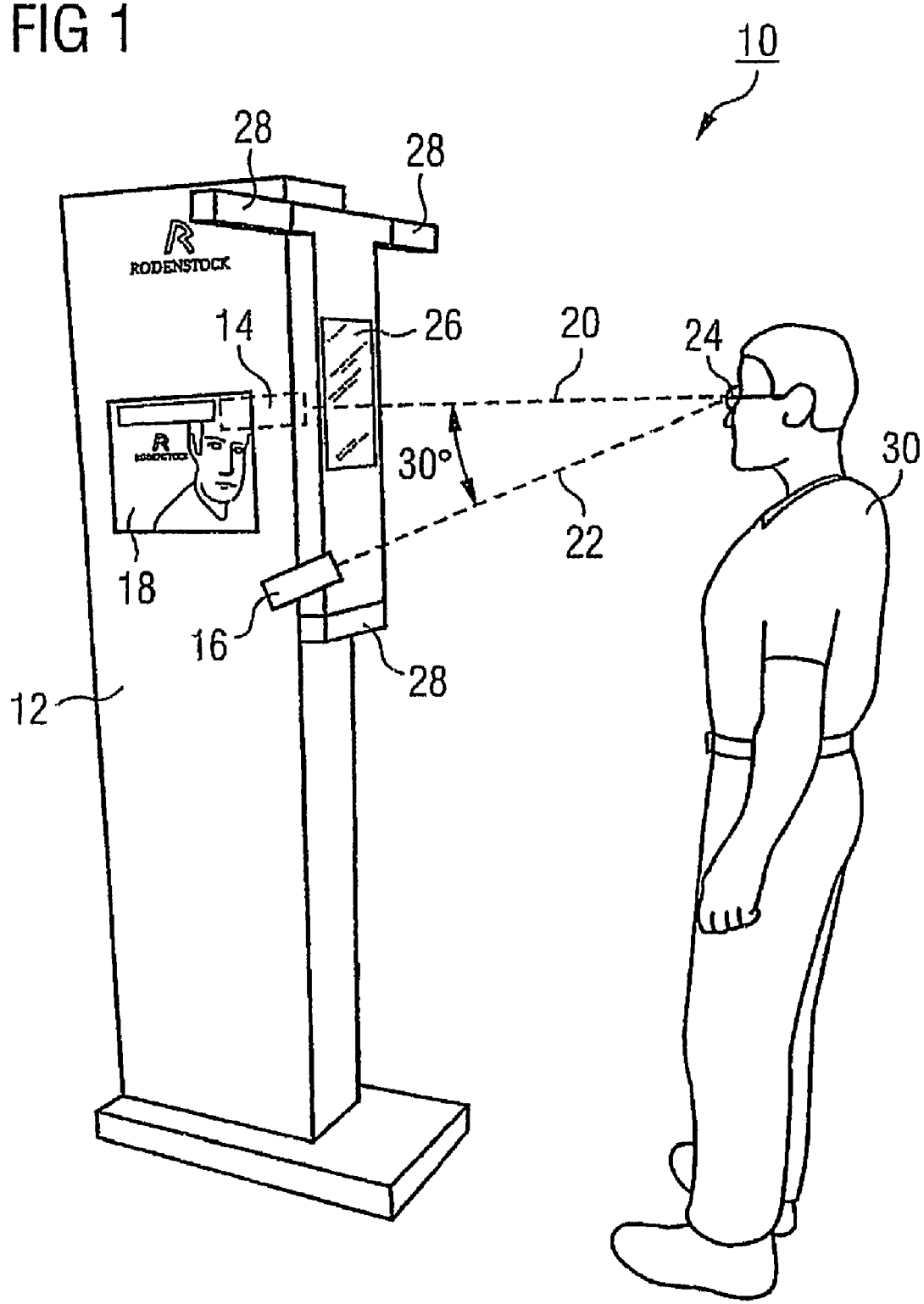
FIG. 1: shows a perspective schematic view of a preferred embodiment of the device of the present invention in the operating position.

FIG. 1 shows a schematic perspective view of a device 10 according to a preferred embodiment of the present invention. The device 10 comprises a configuration unit in the form of a housing and/or a column 12, on which a first image recording unit in the form of an upper camera 14 and a second image recording unit in the form of a lateral camera 16 are situated. Furthermore, a data output unit in the form of a monitor 18 is integrated in the column 12. The upper camera 14 is preferably located in the interior of the column 12, for example, as shown in FIG. 1, at least partially at the same height as the monitor 18. In the operating position, the upper camera 14 and the lateral camera 16 are situated in such a way that an effective optical axis 20 of the upper camera 14 intersects with an effective optical axis 22 of the lateral camera 16 at an intersection point 24. The intersection point 24 of the effective optical axes 20, 22 is preferably the point of the root of the nose (compare FIG. 2).

The upper camera 14 is preferably situated centrally behind a partially reflective mirror 26. The image data of the upper camera 14 is generated through the partially reflective mirror 26. The image data (referred to as images in the following) of the upper camera 14 and the lateral camera 16 is preferably output to the monitor 18. Furthermore, three lamps 28 are situated on the column 12 of the device 10. The lamps 28 may be luminescent rods, such as fluorescent tubes, for example. The lamps 28 may also each contain one or more incandescent bulbs, halogen lights, LEDs, etc.

In the preferred embodiment of the device 10 of the present invention illustrated in FIG. 1, the effective optical axis 20 of the upper camera 14 is situated parallel to the zero viewing direction of a user 30. The zero viewing direction corresponds to the visual axis of the eyes of the user in the primary position. The lateral camera 16 is situated in such a way that the effective optical axis 22 of the lateral camera 16 intersects the effective optical axis 20 of the upper camera 14 in an intersection point 24 at an intersection angle of approximately 30°. The intersection point 24 of the effective optical axes 20, 22 is preferably the point of the root of the nose (compare FIG. 2) of the user 30. In the preferred embodiment of the device 10 of the present invention, this means that the effective optical axis 22 also intersects the zero viewing direction at an angle of 30°. The intersection angle of 30° is a preferred intersection angle. Other intersection angles are also possible. However, the intersection angle is preferably less than approximately 60°. Furthermore, it is not necessary for the effective optical axes 20, 22 to intersect. Rather, it is also possible that the minimum distance of the effective optical axes from the location of the root of the nose of the user 30 is less than approximately 10 cm, for example. Furthermore, it is possible that a further lateral camera (not shown) is situated on the column 12, the further lateral camera lying diagonally opposite the lateral camera 16, for example.

In a further preferred embodiment, the upper camera 14 and the lateral camera 16 may be situated in such a way that their positions and in particular their effective optical axes may be tailored to the body size of the user 30, for example. The determination of the relative positions of the cameras 14, 16 to one another may be performed on the basis of a known calibration method.

Moreover, the cameras 14, 16 may be designed, for example, to each generate single images of a sub-section of the head of the user 30. However, it is also possible that video sequences are recorded on the basis of the cameras 14, 16 and these video sequences are used for further analysis. Preferably, however, single images are generated by the cameras 14, 16 and the single images are used for the further analysis, the upper camera 14 and the lateral camera 16 being time synchronized, i.e., they record or generate synchronous images of the preferably identical sub-section of the head of the user 30. Furthermore, it is possible that images of different sections of the head of the user 30 are recorded by both cameras 14, 16. The images of the two cameras contain at least one identical sub-section of the head of the user 30, however.

In the operating position, the user is preferably situated or positioned in such a way that his gaze is directed toward the partially reflective mirror 26, the user looking at the image of the base of his nose (compare FIG. 2) in the mirror image of the partially reflective mirror 26.

The column 12 may have any arbitrary other shape and/or represent a different type of housing in which the cameras 14, 16 and, for example, the lamps 28, the partially reflective mirror 26, and the monitor 18 are situated.

In the operating position, the distance between the partially reflective mirror 26 and the user 30 is only between approximately 50 and 75 cm, the user 30 standing in front of the mirror and/or being seated in front of the partially reflective mirror 26 in accordance with an activity in which the user 30 wears a pair of spectacles, for example. Therefore, the use of the preferred device according to the present invention is also possible in restricted spatial conditions. Correspondingly, the device 10 may, for example, be designed in such a way that the positions of the upper camera 14 and the lateral camera 16 and, for example, also of the partially reflective mirror 26 and the lamps 28 are situated so they are adjustable in height. The upper camera 14 may therefore also be located above or below the monitor 18. Furthermore, it is also possible to tilt or rotate the column 12, and/or the upper camera 14, lower camera 16, partially reflective mirror 26, and lamps 28 situated on the column 12, around a horizontal axis in the reference system of the earth.

According to a further preferred embodiment of the present invention, for example, the lateral camera 16 may be replaced by a pattern projection unit, such as a typical projector, for example, and the three-dimensional user data may be determined on the basis of a typical method, such as phase-measuring triangulation.

Figure 2:
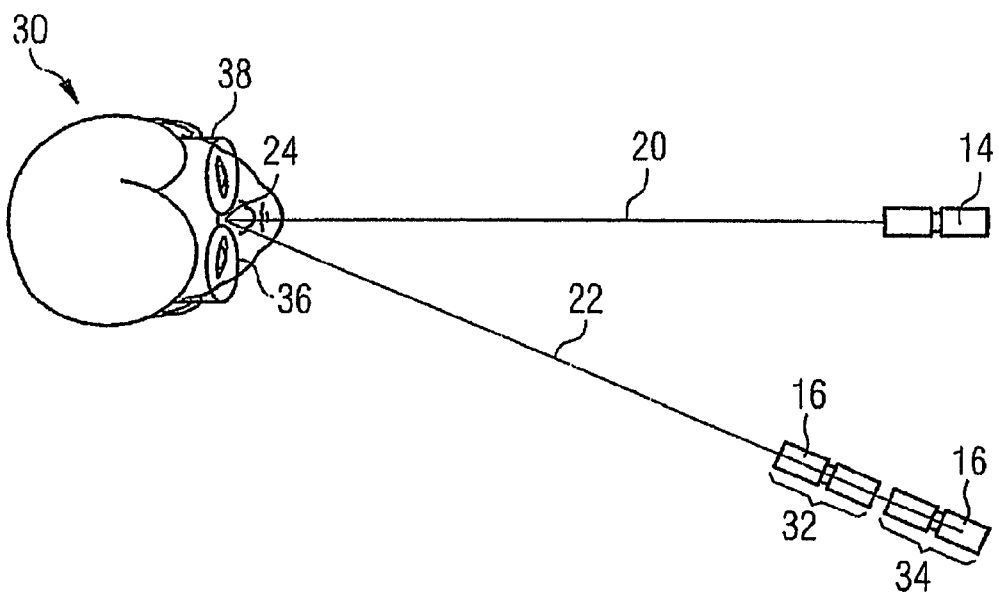
FIG. 2: shows a schematic sectional view in a top view of a configuration of the image recording units according to FIG. 1 in the operating position.

FIG. 2 shows a schematic top view of preferred configurations of the cameras 14, 16 in the operating position and the positioning of a user 30 in the operating position. As shown in FIG. 2, projections of the effective optical axes 20, 22 intersect on a horizontal plane in the reference system of the earth at an angle of 23.5°. The intersection angle between the effective optical axes 20, 22 in the plane which is spanned by the two effective optical axes 20, 22 is 30°, as shown in FIG. 1. The intersection point 24 of the effective optical axes 20, 22 corresponds to the location of the root of the nose of the user 30. As may also be seen from FIG. 2, a position of the lateral camera 16 may be changeable along the effective optical axis 22, for example. The position 32 of the lateral camera 16 corresponds to the position as also shown in FIG. 1, for example. The lateral camera 16 may, for example, also be situated offset along the effective optical axis 22 at a position 34, and preferably the lateral camera 16 may be positioned arbitrarily. However, at least one pupil (not shown) of the user as well as at least one spectacle lens edge 36 or a spectacle frame edge 36 of a pair of spectacles 38 of the user must be imaged in the image data generated by the lateral camera 16. Furthermore, the pupil must be completely imaged inside the spectacle frame or lens edge 36 of the pair of spectacles 38. Analogously, the upper camera 14 may also be positioned differently.

Figure 3:
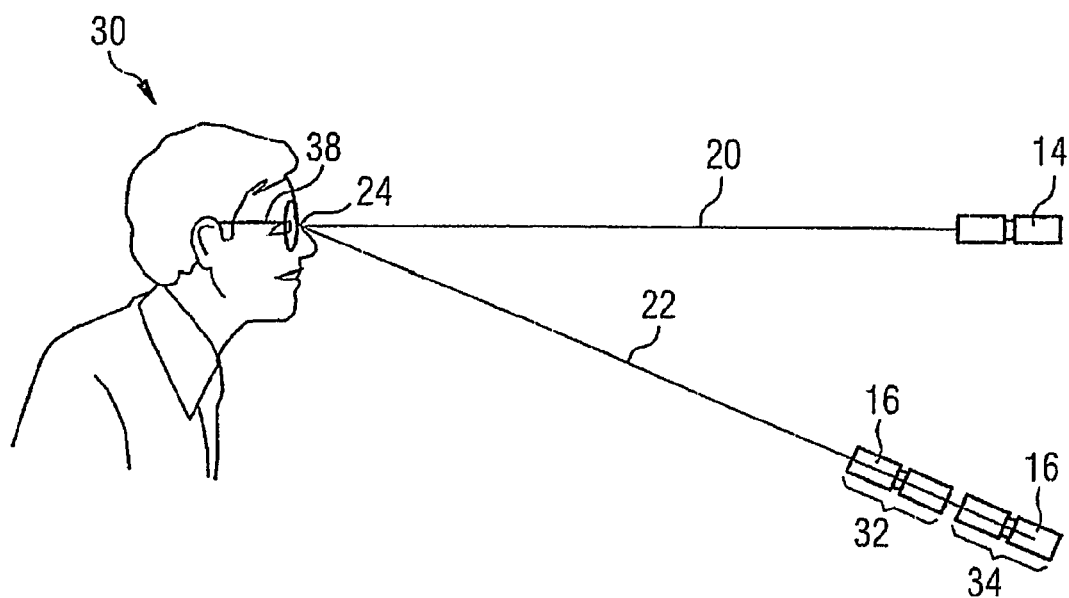
FIG. 3: shows a schematic sectional view from the side of a configuration of image recording units according to FIG. 1 in the operating position.

FIG. 3 shows a schematic sectional view of the configuration of the cameras 14, 16 in the operating position as well as a position of the user 30 in the operating position, from the side, as shown in FIG. 1. As already shown in FIG. 2, the lateral camera 16 may be positioned along the effective optical axis, for example, at the position 32 or at the position 34. Furthermore, in FIG. 3, the projection of the effective optical axes 20, 22 on a vertical plane in the reference system of the earth is shown. The angle between the effective optical axes 20, 22 is 23.5°, for example, which corresponds to an intersection angle of 30° in the plane which is spanned by the effective optical axes 20, 22.

Figure 4:
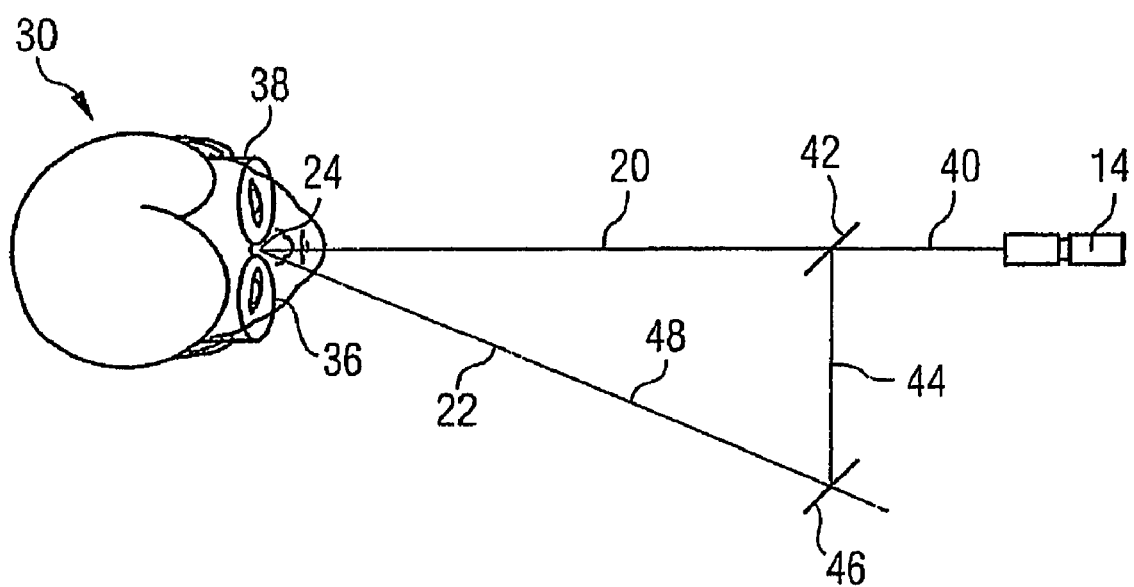
FIG. 4: shows a schematic sectional view in a top view of a further preferred embodiment of the present invention in the operating position.

FIG. 4 shows a sectional view of a second preferred embodiment of the device 10 according to the present invention in a top view. Instead of two cameras, only the upper camera 14 is used. The upper camera 14 has an optical axis 40. The optical axis 40 corresponds to a line which extends from a center point of the aperture (not shown) of the upper camera 14 and is perpendicular to the plane of the aperture (not shown) of the upper camera 14.

Starting from the upper camera 14, a beam splitter 42 is located in the beam path of the camera 14 in the direction of the optical axis 40. The beam splitter 42 is designed, for example, in such a way that it may change between two types of operation:

the beam splitter 42 is either nearly completely reflective or
the beam splitter is nearly completely transparent to light.

For example, if the beam splitter 42 is completely transparent to light, the optical axis 40 of the upper camera 14 is not deflected, but rather intersects the head of the user 30 at an intersection point 24. In this case, the effective optical axis 20 corresponds to the optical axis 40 of the upper camera 14. However, if the beam splitter 42 is completely reflective, the optical axis 40 of the upper camera 14 is deflected by the beam splitter 42 according to known optical laws, as shown in FIG. 4. For example, the optical axis 40 is deflected by an angle of 90° into a first deflected sub-section 44 of the optical axis 40 of the upper camera 14. The first deflected sub-section 44 intersects a further optical element, such as a deflection mirror 46. The first deflected sub-section 44 of the optical axis 40 is thus again deflected according to the typical optical laws into a second deflected sub-section 48 of the optical axis 40. The second deflected sub-section 48 of the optical axis 40 intersects the head of the user 30. The second deflected sub-section 48 of the optical axis 40 corresponds to the effective axis 22 of the upper camera 14, for the case in which the beam splitter 42 is completely reflective.

Time-delayed images of the sub-section of the head of the user 30 are generated by the upper camera 14, the images either being generated with completely reflective beam splitter 42 or with completely transparent beam splitter 42. In other words, two images of the sub-section of the head of the user 30 may be generated on the basis of the upper camera 14, said images corresponding to the images as may be generated according to FIG. 1, 2, or 3. However, the images in this preferred embodiment are generated with a time delay by one image recording unit, the upper camera 14.

Figure 5:
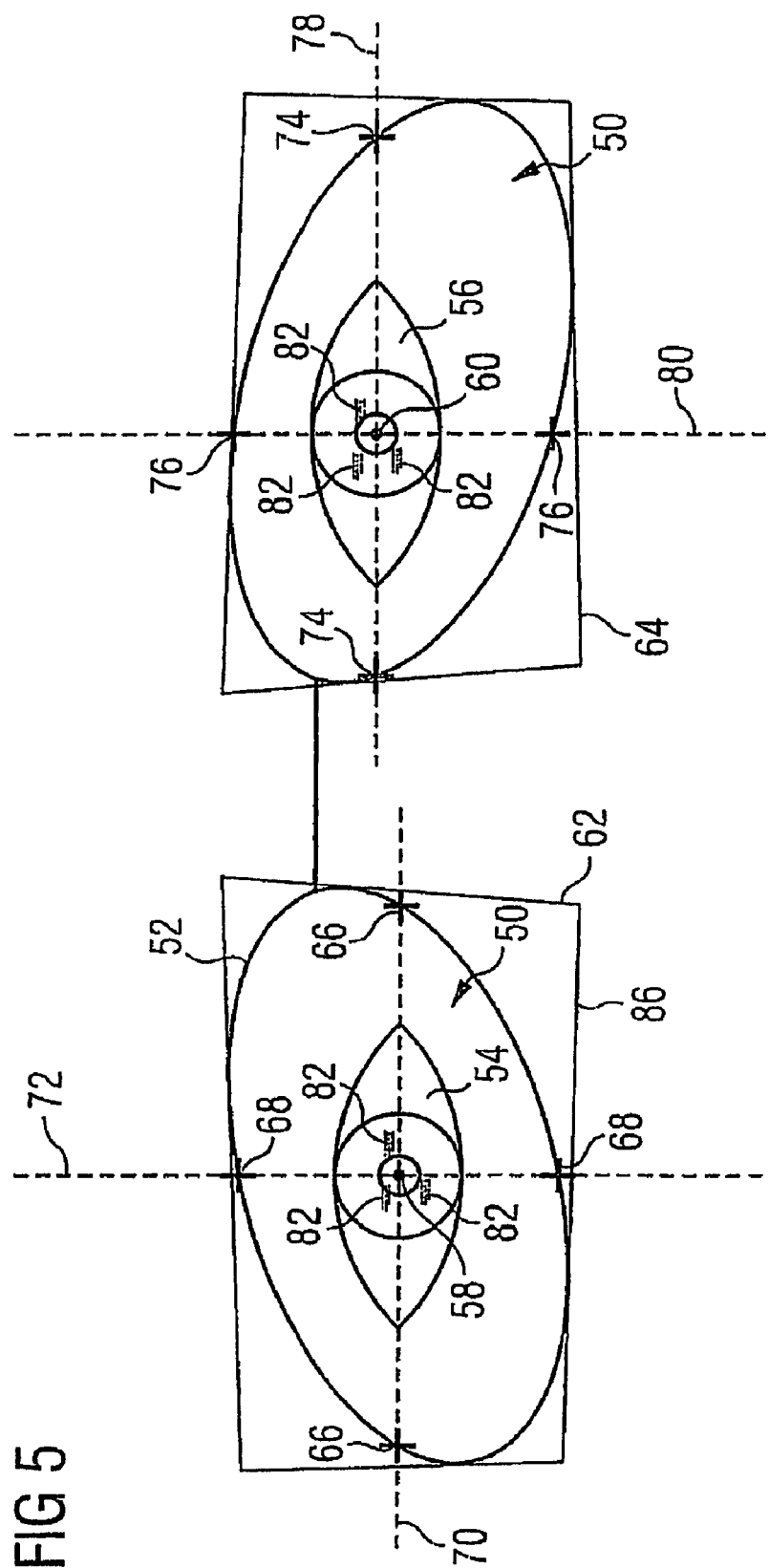
FIG. 5: shows a schematic view of exemplary image data.

FIG. 5 shows a schematic view of image data as are generated by the upper camera 14, i.e., a schematic frontal view of a sub-section of the head of the user 30, only two spectacle lenses 50 as well as a spectacle frame 52 as well as a right eye 54 and a left eye 56 of the user 30 being illustrated. A pupil center point 58 of the right eye 54 and a pupil center point 60 of the left eye 56 are shown as user data in FIG. 5. Furthermore, FIG. 5 shows a delimitation 62 of the spectacle frame 52 for the right eye 54 and a delimitation 64 of the spectacle frame 52 for the left eye 56 in the boxing system, as well as intersection points 66 of a horizontal plane in the reference system of the user with the spectacle frame edge 52 in regard to the right eye 54 as well as intersection points 68 of a vertical plane in the reference system of the user 30 perpendicular to the horizontal plane of the user 30. The horizontal plane is indicated by the dashed line 70, the vertical plane by the dashed line 72.

Analogously, intersection points 74 of a horizontal plane and intersection points 76 of a vertical plane for the left eye 56 are shown in FIG. 5, the horizontal plane being indicated by the dashed line 78 and the vertical plane by the dashed line 80.

The pupil center points 58, 60 are preferably determined automatically by a user data positioning unit (not shown). For this purpose, reflexes 82 are used, which arise on the corneas of the particular eyes 54, 56 because of the lamps 28. Because, according to the embodiment of the device 10 of the present invention shown in FIG. 1, for example, three lamps 28 are situated, three reflexes 82 are imaged per eye 54, 56. The reflexes 82 arise for each eye 54, 56 directly on the penetration point of a particular lamp visual axis on the cornea. The lamp visual axis (not shown) is the connecting straight line between the location of the particular lamp 28 which is imaged centrally on the retina and the particular pupil center point 58, 60 of the corresponding eye 54, 56. The extension of the lamp visual axis (not shown) goes through the optical eye rotation point (not shown). Preferably, the lamps 28 are situated in such a way that they lie on a conical lateral surface, the apex of the cone being located at the pupil center point 58 or 60 of the right eye 54 or left eye 56, respectively. The axis of symmetry of the cone is situated parallel to the effective optical axes 20 of the upper camera 14 extending from the cone apex, the three lamps 28 also being situated in such a way that connecting straight lines of the cone apex and the particular lamp 28 only intersect at the cone apex.

The pupil center point 58 or 60 of the right eye 54 or the left eye 56, respectively, may be determined on the basis of the reflexes 82 for the right eye 54 or the left eye 56.

Figure 6:
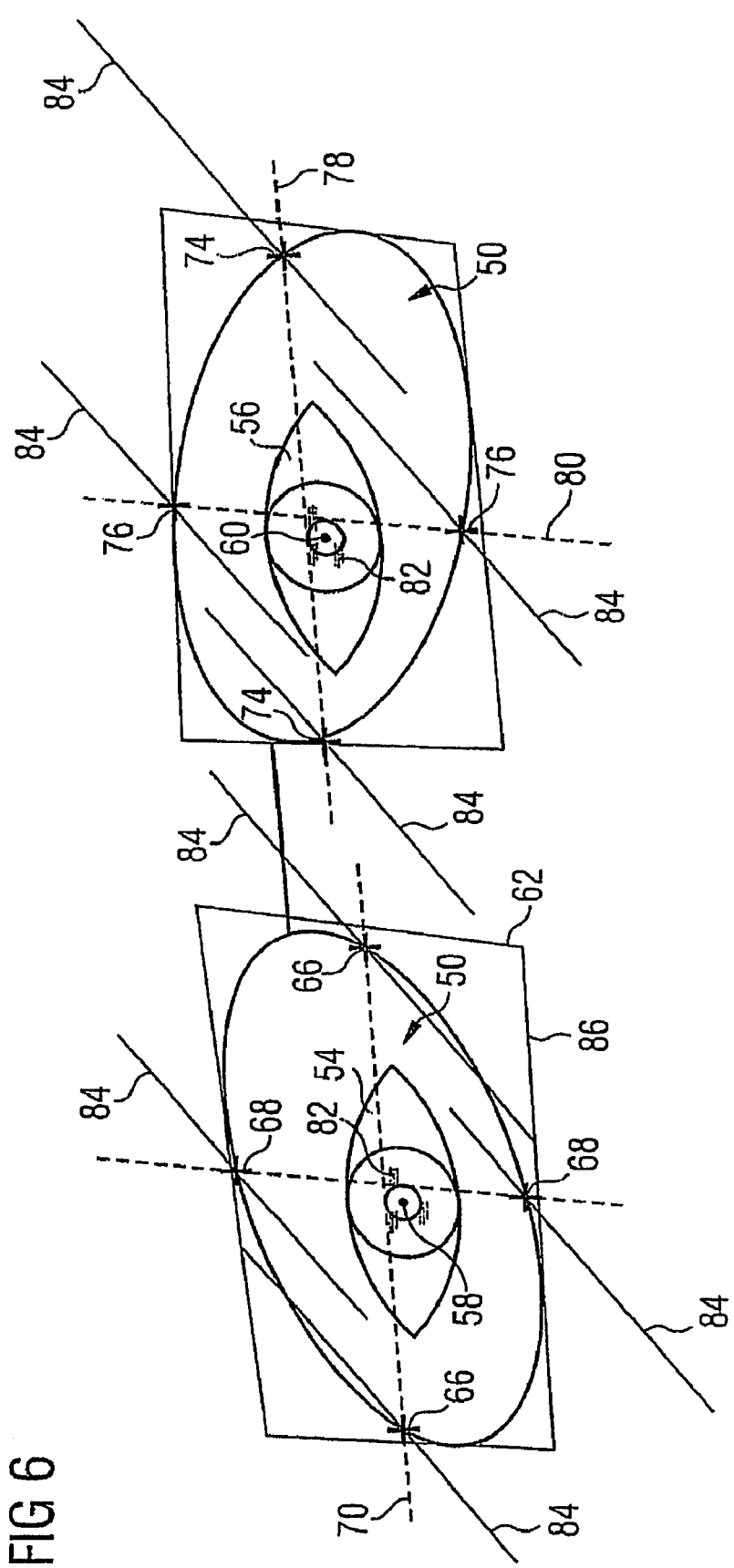
FIG. 6: shows a further schematic view of exemplary image data.

FIG. 6 shows a schematic view of the image data of the lateral camera 16 according to FIG. 5. Because the lateral camera 16 is located laterally below the sub-section of the head of the user 30, intersection points of a horizontal and a vertical plane with the edges of the spectacle frame 52 do not lie on horizontal or vertical straight lines, as is the case in FIG. 5. Rather, straight lines on which intersection points with the horizontal plane and a vertical plane lie are projected on inclined straight lines 84 because of the perspective view of the lateral camera 16. The horizontal plane 70 and the vertical plane 72 therefore intersect the edge 36 of the spectacle frame 52 at the locations at which the projected straight lines 84 each intersect the edge 36 of the spectacle frame 52. Analogously, the pupil center points 58, 60 may also be determined on the basis of the reflexes 82 on the basis of the image data illustrated in FIG. 6.

Three-dimensional coordinates of the system of spectacles 30 and eye(s) 54, 56 may be generated using the intersection points 66, 68, 74, 76 shown in FIGS. 5 and 6 and the pupil center points 58, 60. Furthermore, specific points in the boxing system may be used to determine the three-dimensional coordinates. Alternatively, the three-dimensional coordinates may also be at least partially generated using the points determined according to the boxing system if necessary. On the basis of the positions in the image data, i.e., the intersection points 66, 68, 74, 76 and the pupil center points 58, 60, knowing the positions of the upper camera 14 and the lateral camera 16, location relations may be generated in the three-dimensional space in the system of eye(s) 54, 56 and spectacles 30. The intersection points 66, 68, 72, 74 and/or the pupil center points 58, 60 may be determined by an optician and input on the basis of a computer mouse (not shown). Alternatively, the monitor 18 may also be designed as a "touch screen" and the intersection points 66, 68, 72, 74 and/or the pupil center points 58, 60 may be determined and input directly on the basis of the monitor 18. Alternatively, these data may also be generated automatically on the basis of image recognition software, however. In particular, it is possible that software-supported image analysis is performed at subpixel precision. According to a further embodiment of the present invention, the positions of further points of the spectacles 38 may be determined and used for determining the optical parameters in the three-dimensional space.

Optical parameters of the user 30 may be determined on the basis of the three-dimensional user data of the system of eyes 54, 56 and spectacles 30, head and gaze movements being able to be considered in this determination. For this purpose, for example, multiple images are generated, the user 30 executing a head movement and/or tracking a moving object using his eyes, for example. Alternatively, it is also possible to generate images upon discrete head or gaze deflections, which may be used, for example, for determining a convergence behavior of the eyes or for determining differences in the gaze deflection behavior. As shown in FIG. 1, the user is preferably positioned in a primary position, and, as shown in FIG. 2, for example, the effective optical axes 20 of the upper camera 14 and the center parallel lines of the visual axes of the eyes 54, 56 in the primary position are identical. A further embodiment of the device 10 of the present invention is designed in such a way that only one eye, i.e., either the right eye 54 or the left eye 56, is imaged by both the upper camera 14 and also the lateral camera 16. The optical parameters of the user 30 are determined on the basis of one eye 54, 56 and the optical parameters for both eyes 54, 56 are determined with assumption of symmetry.

According to the device 10 of the present invention, the optical parameters, i.e., for example, interpupillary distance, corneal vertex distance, bow angle, pantoscopic angle, and grinding height, may advantageously be determined for a user 30 whose gaze deflection does not correspond to the zero viewing direction. Rather, the user 30 looks at the image of the bridge of his nose in the partially reflective mirror 26 at a distance of approximately 50 to 75 cm according to the present invention. In other words, the user 30 is located at a distance of approximately 50 to approximately 75 cm in front of the partially reflective mirror 26, and looks at the image of his face in the partially reflective mirror 26, in particular at the root of his nose. The position of the eyes 54, 56 which results due to the viewed object, i.e., the convergence of the eyes 54, 56, may be taken into consideration when determining the optical parameters and rotations of the eyes may be compensated for during the determination of the optical parameters, for example, a virtual zero viewing direction being able to be determined in consideration of the actual gaze deflection, and the optical parameters of the user being able to be determined on the basis of the virtual zero viewing direction, i.e., the determined and unmeasured zero viewing direction. Therefore, the distance between user 30 and the cameras 14, 16 may advantageously be small. In particular, it is also possible that the optical parameters are already approximately predetermined. Furthermore, the spectacles 38 may be previously tailored and the optical parameters may be determined using the device 10 of the present invention for the pre-tailored spectacles.

Moreover, according to a further preferred embodiment, the device 10 is designed to calculate the pantoscopic angle of the spectacles 38 for each eye 54, 56 from the angle between the straight lines through the upper intersection points 68 and the lower intersection points 68 of the vertical sectional plane 72 with the edge 36 of the spectacle frame 52 in the three-dimensional space. In addition, a mean pantoscopic angle may be determined from the pantoscopic angle determined for the right eye 54 and the pantoscopic angle determined for the left eye 56. Furthermore, a warning notification may be output if the pantoscopic angle of the right eye 54 deviates from the pantoscopic angle of the left eye 56 by at least one predetermined maximum value. Such a notification may be output using the monitor 18, for example. Analogously, the bow angle and corneal vertex distance and/or interpupillary distance may be determined from the three-dimensional data set for the right eye 54 and the left eye 56 as well as mean values thereof and notifications may be output via the monitor 18 if necessary if the deviations of the values for the right eye 54 and the left eye 56 each exceed a maximum value.

The corneal vertex distance may alternately be calculated according to reference point requirement or according to optical rotation point requirement. According to the reference point requirement, the corneal vertex distance corresponds to the distance of the vertex of the spectacle lens 50 in front of the cornea at the penetration point of the visual axis of the eye in the zero viewing direction. According to the optical rotation point requirement, the corneal vertex distance corresponds to the minimum distance of the cornea from the spectacle lens 50.

Furthermore, the device 10 of the present invention may be designed in such a way that the grinding height of the spectacle lens 50 is calculated on the basis of the distance of the penetration point of the visual axis of an eye 54, 56 in the primary position with a lens plane of a spectacle lens 50 from a lower horizontal tangent in the lens plane. A lower horizontal tangent is, for example, the line 84 of the delimitation 62, 64 according to the boxing system in FIGS. 5 and 6. Preferably, the device 10 is designed so that a three-dimensional closed polyline is determined for the lens shape of the spectacle lens 50 from points on the edge 36 of the spectacle frame 52 for each eye 54, 56, an averaged polyline for the lens shape being able to be determined from polylines of the particular spectacle lenses 50 of the right eye 54 and the left eye 56.

Alternatively, it is also possible that instead of averaging the values of the optical parameters which are determined for the right eye 54 and the left eye 56, the optical parameters, or the polylines for the lens shape, are only determined for the spectacle lens 50 of one of the eyes 54, 56 and these values are also used for the other of the eyes 54, 56.

Furthermore, the device may be used according to a preferred embodiment to generate images of the user 30 and to superimpose image data of multiple sets of frame and/or spectacle lens data on these images, by which it is possible to advise the user 30 optimally. In particular, materials, layers, thickness, and colors of the spectacle lenses, whose image data are superimposed on the generated image data, may be varied. The device 10 according to the present invention may therefore be designed to provide tailoring recommendations, in particular optimized individual parameters for multiple different spectacle frames or spectacle lenses.

Figure 7:
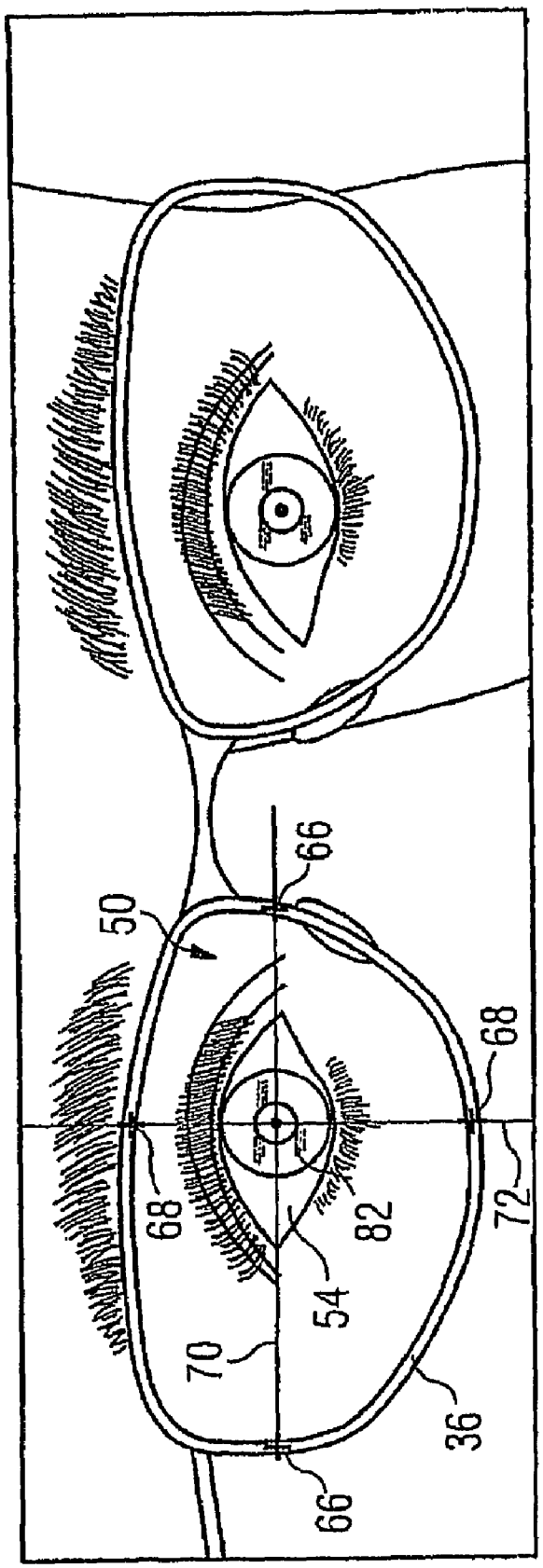
FIG. 7: shows exemplary image data according to FIG. 5.
Figure 8:
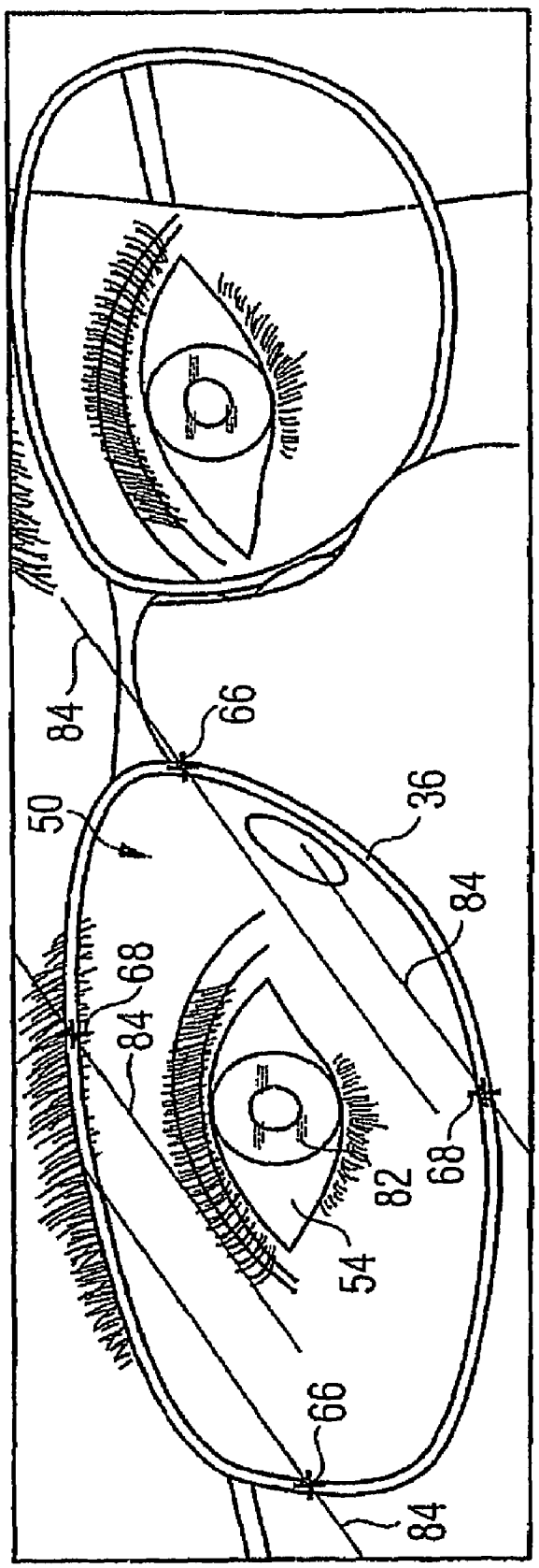
FIG. 8: shows exemplary image data according to FIG. 6.

FIGS. 7 and 8 show images which are generated by the upper camera 16 (FIG. 7) and the lateral camera 16 (FIG. 8), for example. The images also show the intersection points 66, 68 of the horizontal plane 70 and the vertical plane 72 as well as the reflexes 82 for the right eye 54 of the user 30. Projections of the possible intersection points of the horizontal plane 70 and vertical plane 72 with the edge 36 of the spectacle frame 52 taking the perspective view of the lateral camera 16 into consideration as the straight lines 84 are shown in FIG. 8.

Figure 9:
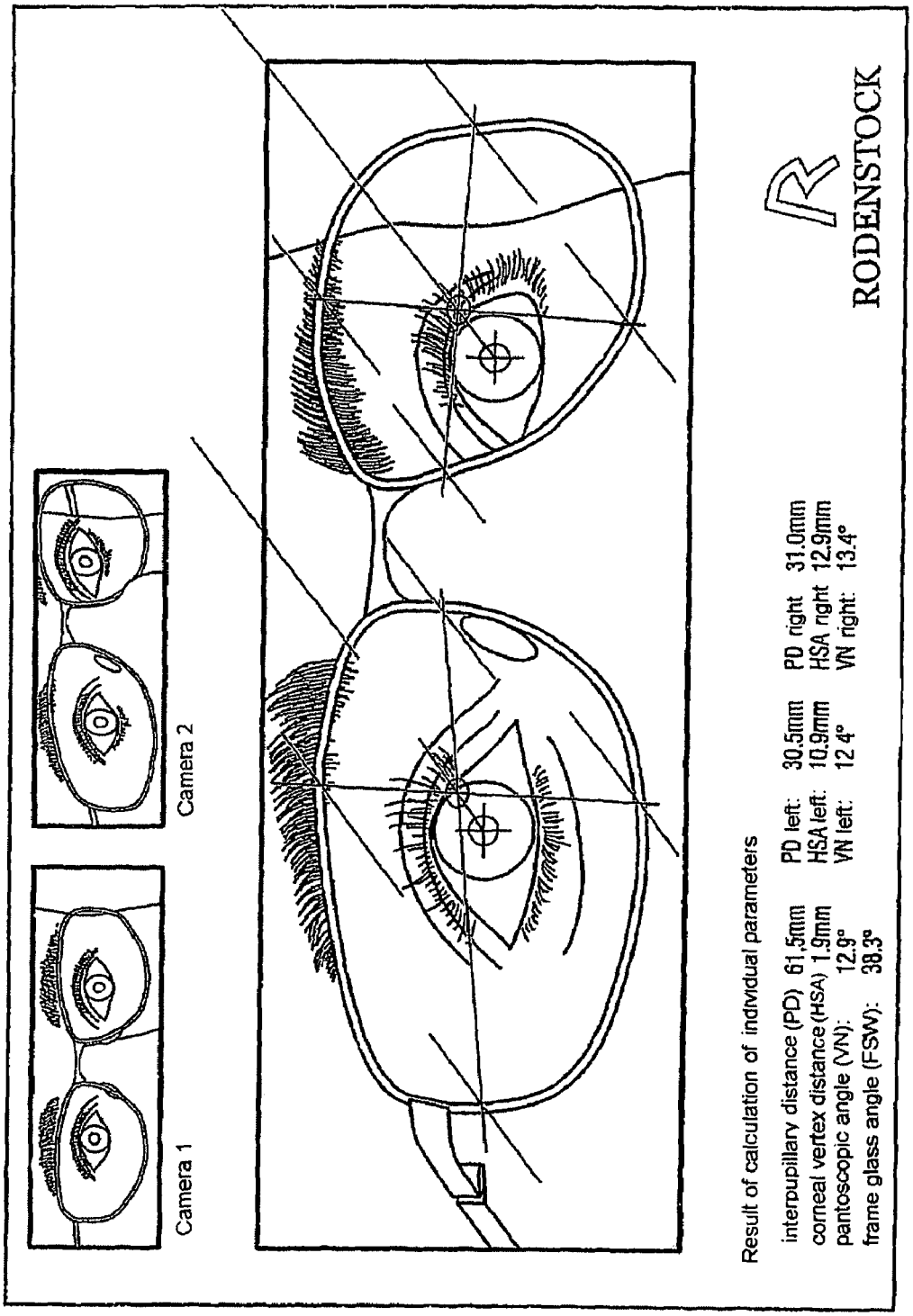
FIG. 9: shows exemplary output data as are output according to a preferred embodiment of the present invention.

FIG. 9 shows an output image as may be shown on the monitor 18, for example, the image data of the upper camera 14 (identified as camera 1) and the lateral camera 16 (identified as camera 2) being shown. Furthermore, an image of the lateral camera 16 is shown in which the user data are superimposed. Furthermore, the optical parameters for the right eye 54 and the left eye 56, as well as mean values thereof, are shown.

Preferably, multiple lamps 28 are situated in such a way that reflexes 82 for each eye 54, 56 are generated directly at the penetration point of the particular visual axis on the cornea or geometrically defined around the penetration point for all cameras 14, 16. Furthermore, the lamps 28 are preferably situated in such a way that the reflexes 82 are particularly generated for the penetration point of the particular visual axis of the eyes 54, 56 in the primary position. Very especially preferably, for both eyes approximately geometrically defined corneal reflexes are positioned around the penetration point for the upper camera 14 and, for the lateral camera 16, reflexes are positioned at the penetration point of the visual axes of the eyes 54, 56 in the primary position, by a lamp 28 on the particular central parallel of the two visual axes of the eyes 54, 56 in the effective optical axis 22 of the lateral camera 16 reflected in the primary position, and two further lamps 28, which is defined as the generatrix on the cone by the central parallel of the visual axes of the eyes 54, 56 in the primary position as the cone axis and the effective optical axis 20 of the lateral camera 16, in such a way that all lamps 28 lie on disjunctive generatrices of the cone and the lamps 28 have a horizontal extension which corresponds to the equation (mean interpupillary distance)/(horizontal extension)=
(distance of upper camera 14 to eye 54, 56)/(distance of lamp 28 to eye 54, 56).

The present invention is not restricted to the especially preferred embodiments described above. Rather, the present invention also comprises variations thereof, in particular the use of a device according to the present invention for determining optical parameters of a user.

Furthermore, the present invention comprises a system including a device for determining optical parameters of the user and a user, the system comprising at least two image recording units, which are designed and situated to each generate image data of at least sub-sections of the head of the user;
a data processing unit having
a user data determination unit, which is designed to determine user data of at least one sub-section of the head or at least one sub-section of a system of the head and a pair of spectacles of the user situated thereon in the wearing position on the basis of the generated image data, the user data comprising location information in the three-dimensional space of predetermined points of the sub-section of the head or the sub-section of the system of the head and the pair of spectacles of the user situated thereon in the wearing position, and
a parameter determination unit, which is designed to determine at least one part of the optical parameters of the user on the basis of the user data;
a data output unit, which is designed to output at least one part of the determined optical parameters of the user.

The invention claimed is:

1. A device for determining optical parameters of a user having
at least two image recording units configured and arranged to generate image data of at least sub-sections of the head of the user;
a data processing unit having a user data determination unit configured to determine user data of at least one sub-section of the head or at least one sub-section of a system of the head and a pair of spectacles of the user situated thereon in the wearing position on the basis of the generated image data, the user data comprising location information in the three-dimensional space of predetermined points of the sub-section of the head or of the sub-section of the system and a parameter determination unit configured to determine at least one part of the optical parameters of the user on the basis of the user data;
a data output unit configured to output at least one part of the determined optical parameters of the user;
wherein, in an operating position, the image recording units are situated inside a spatial area which is enclosed by a cone having a predetermined aperture angle of less than 90°, and apex of the cone being situated in the surroundings of a predetermined reference point and an axis of the cone being situated parallel to a predetermined operation direction, the zero viewing direction of the user corresponding to the predetermined operation direction.

2. The device according to claim 1, wherein the image recording units are designed and situated in such a way that at least one pupil of the user is completely imaged in the generated image data.

3. The device according to claim 1, wherein the image recording units are designed and situated in such a way that at least one pupil of the user and one spectacle frame edge and/or one spectacle lens edge are imaged in the generated image data, the at least one pupil of the user being enclosed by the spectacle frame edge and/or the spectacle lens edge in the generated image data.

4. The device according to claim 1, wherein the user data comprise location information for at least one of the following points:

intersection points of a horizontal plane in the reference system of the user with the spectacle lens edges and/or the spectacle frame edges of the spectacles, the horizontal plane of the user intersecting both pupils of the user and running parallel to the zero viewing direction of the user;

intersection points of a vertical plane in the reference system of the user with the spectacle lens edges and/or the spectacle frame edges of the spectacles, the vertical plane of the user running perpendicularly to the horizontal plane of the user and parallel to the predetermined zero viewing direction of the user and intersecting a pupil of the user;

at least one pupil center point;

delimitations of at least one spectacle lens of the user according to a dimensioning in the boxing system;

a bridge center point of the spectacle frame of the spectacles.

5. The device according to claim 1, wherein the optical parameters comprise at least one of the following values of the user:

interpupillary distance;
monocular interpupillary distance;
corneal vertex distance according to reference point requirement and/or according to eye rotation point requirement;
monocular centration distance;
centration point coordinates;
lens distance or boxed lens distance;
decentration of the centration point;
lens height and width or boxed lens height and width;
lens center distance or boxed lens center distance;
spectacle lens pantoscopic angle;
bow angle;
grinding height.

6. The device according to claim 1, wherein the aperture angle is between approximately 60° and approximately 10°, preferably between approximately 45° and approximately 20°, especially preferably approximately 30°.

7. The device according to claim 1, wherein effective optical axes of the image recording units at least approximately intersect and an intersection angle is between approximately 60° and approximately 10°, preferably between approximately 45° and approximately 20°, especially preferably approximately 30°.

8. The device according to claim 1, wherein, in operation, the zero viewing direction of the user is a situated essentially parallel to the effective optical axis of at least one of the image recording units.

9. The device according to claim 1, wherein the effective optical axis of at least one of the image recording units is situated essentially parallel to a horizontal direction in the reference system of the earth.

10. The device according to claim 1, wherein, in operation, the horizontal plane of the user is situated in such a way that the effective optical axis of at least one of the image recording units lies therein.

11. The device according to claim 1, wherein, in the operating position, one of the image recording units is situated in such a way that its effective optical axis at least approximately intersects the root of the nose of the user.

12. The device according to claim 1, wherein, in the operating position, one of the image recording units is positioned in such a way that its effective optical axis is situated symmetrically in relation to the pupils of the user.

13. The device according to claim 1, wherein projections of the effective optical axes of the at least two image recording units intersect on a horizontal plane in the reference system of the earth at an intersection angle which is between approximately 10° and approximately 60°, preferably between approximately 15° and approximately 40°, especially preferably approximately 23.5°.

14. The device according to claim 1, wherein projections of the effective optical axes of the at least two image recording units intersect on a vertical plane in the reference system of the earth at an intersection angle which is between approximately 10° and approximately 60°, preferably between approximately 15° and approximately 40°, especially preferably approximately 23.5°.

15. The device according to claim 1, wherein, in the operating position, the zero viewing direction of the user is situated parallel to the horizontal plane in the reference system of the earth.

16. The device according to claim 1, wherein the user data determination unit also comprises a user data positioning unit, which is designed to assign positions in the two-dimensional space of the image data to predetermined user data.

17. The device according to claim 16, wherein the user data positioning unit is designed in such a way that the positions in the image data which are assigned to at least one part of the predetermined user data are assignable by a person.

18. The device according to claim 17, wherein the user data positioning unit is designed to predetermine positions of the image data which are assigned to the predetermined user data, taking location information of at least one of the image recording units in the three-dimensional space into consideration.

19. The device according to claim 16, wherein the user data positioning unit is designed to assign positions in the two-dimensional space of the image data automatically to at least one part of the user data.

20. The device according to claim 1, wherein the at least two image recording units are designed to generate the image data synchronously.

21. The device according to claim 1, wherein the image recording units (generate image data of both eyes of the user synchronously.

22. The device according to claim 21, wherein the image recording units are designed to generate image data of the user for multiple different viewing directions of the user.

23. The device according to claim 21, wherein the data processing device is designed to determine vision behavior of the user on the basis of the multiple sets of image data.

24. A device for determining optical parameters of a user having
at least one image recording unit configured and arranged to generate image data of at least sub-sections of the head of the user;
at least one pattern projection unit configured and arranged to project predetermined pattern data on at least sub-sections of the head of the user;
a data processing unit having a user data determination unit configured to determine user data of at least one sub-section of the head or at least one sub-section of a system of the head and a pair of spectacles of the user situated thereon in the wearing position on the basis of the generated image data, taking the projected pattern data into consideration, the user data comprising location information in the three-dimensional space of predetermined points of the sub-section of the head or the sub-section of the system, and
a parameter determination unit configured to determine at least one part of the optical parameters of the user on the basis of the user data;

a data output unit configured to output at least one part of the determined optical parameters of the user;

wherein, in an operating position, the at least one image recording unit is situated inside a spatial area which is enclosed by a cone having a predetermined aperture angle of less than 90°, and apex of the cone being situated in the surroundings of a predetermined reference point and an axis of the cone being situated parallel to a predetermined operation direction, the zero viewing direction of the user corresponding to the predetermined operation direction.

25. A method for determining optical parameters of a user comprising:

generating image data of at least sub-sections of the head of the user from at least two different recording directions inside a spatial area which is enclosed by a cone having a predetermined aperture angle of less than 90°, and apex of the cone being situated in the surroundings of a predetermined reference point and an axis of the cone being situated parallel to a predetermined operation direction, the zero viewing direction of the user corresponding to the predetermined operation direction;

determining user data of at least one sub-section of the head or at least one sub-section of a system of the head and a pair of spectacles of the user situated thereon in the wearing position on the basis of the generated image data, the user data comprising location information in the three-dimensional space of predetermined points of the sub-section of the head or the sub-section of the system;

determining at least one part of the optical parameters of the user on the basis of the user data, and outputting at least one part of the determined optical parameters of the user;

wherein, in the operating position, the image recording units are situated inside a spatial area which is enclosed by a cone having a predetermined aperture angle of less than 90°, the cone apex of the cone being situated in the surroundings of a predetermined reference point and the cone axis being situated parallel to a predetermined direction, the zero viewing direction of the user corresponding to the predetermined direction in operation.

26. The method according to claim 25, wherein at least one pupil is completely imaged in the generated image data.

27. The method according to claim 25, wherein at least one pupil of the user and a spectacle frame edge and/or a spectacle lens edge is imaged in the generated image data, the at least one pupil of the user being enclosed by the spectacle frame edge and/or the spectacle lens edge in the generated image data.

28. A computer program product comprising program parts which, when loaded into a computer, are designed for performing a method according to claim 25.

* * * * *